T. C. OTTINGER.
FEED TROUGH.
APPLICATION FILED JUNE 22, 1908.
903,309.
Patented Nov. 10, 1908.
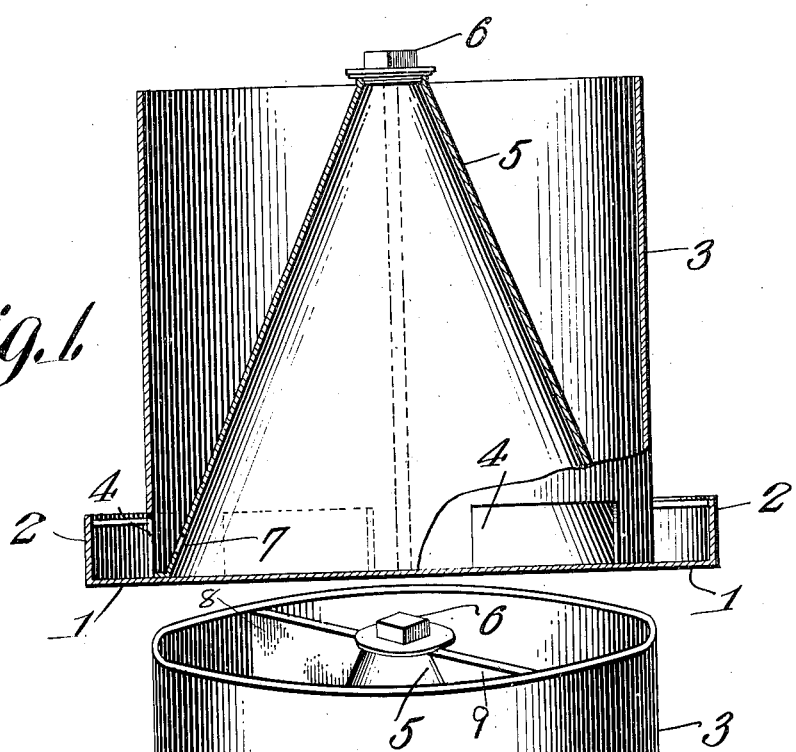
Fig.1.
Fig.2.
Witnesses
Inventor
Thomas C. Ottinger,
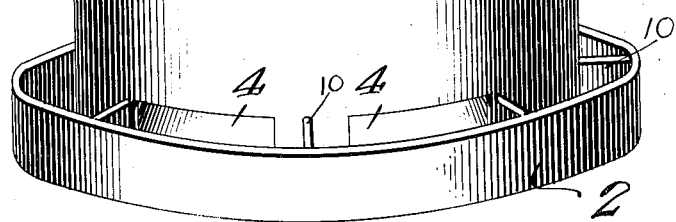
By C. A. Snow & Co.
Attorneys

UNITED STATES PATENT OFFICE.

THOMAS C. OTTINGER, OF HYDRO, OKLAHOMA.

FEED-TROUGH.

No. 903,309.  Specification of Letters Patent.  Patented Nov. 10, 1908.

Application filed June 22, 1908. Serial No. 439,873.

*To all whom it may concern:*

Be it known that I, THOMAS C. OTTINGER, a citizen of the United States, residing at Hydro, in the county of Caddo and State of Oklahoma, have invented a new and useful Feed-Trough, of which the following is a specification.

This invention relates to improvements in feeders for stock, poultry and the like.

It has for one of its objects to provide a device having a conical bottom which will serve to keep the feed trough constantly full.

It is a well known fact when it is desired to feed stock or poultry with soaked grain that the latter has to be prepared generally before putting into the trough and with self feeding devices like the present invention this method has many disadvantages chief among which is that the grain in its wet state will adhere to the sides and bottom and not properly feed to the trough; another disadvantage is if the entire mash is not consumed within a reasonable time it will have a tendency to sour.

The present invention aims to remedy these defects by so constructing a device of this kind that a supply of water will be automatically distributed to the grain in the trough sufficient to form a mash, and this supply will be kept going as long as grain is fed into the hopper.

With these and other objects in view as will more fully hereinafter appear the present invention consists in certain novel details of construction and arrangement of parts hereinafter fully described, illustrated in the accompanying drawings and particularly pointed out in the appended claims. It being understood that various changes in the form, proportion, size and minor details of the device may be made without departing from the spirit or sacrificing any of the advantages of the invention.

In the accompanying drawings forming a part of this specification Figure 1 is a vertical sectional view of the device. Fig. 2 is a perspective view.

Similar numerals of reference are employed to indicate corresponding parts throughout.

In the construction illustrated a plate 1 preferably formed of metal or other suitable material, and preferably circular in marginal contour forms the base or support of the device. From the periphery of this base rises the vertical trough wall 2 either formed integral therewith or otherwise secured to the base plate 1. The height of this trough wall varies in proportion to the size of feeder used it being obvious that larger feeders will be used for stock than for poultry.

Secured to the upper face of the base plate 1 is a cylindrical feed tank or hopper 3, considerably less in exterior diameter than the base plate 1, and projecting a considerable distance beyond the upper edge of the vertical trough wall 2.

With this construction it is obvious that an annular space will be formed by the outer wall of the feed tank and inner face of the trough wall; this space constitutes the trough proper and is designed to hold grain and the like.

Communication is established between the interior of the hopper and the trough by means of a plurality of oblong ports 4 extending upwardly from the lower edge of the hopper 3 to a point approximately in a plane with the upper edge of the trough wall 2.

Secured to the base plate 1, and within the hopper 3 is a water tank or reservoir 5 the lower edge of which abuts against the inner face of the hopper 3 as shown in Fig. 1.

The tank or reservoir is substantially frusto conical in shape its upper edge lying in a plane with the upper edge of the hopper 3 and interiorly screw threaded for the reception of a threaded plug 6, which serves to seal the tank when the latter is filled with water.

By reference to Fig. 1 it will be seen that the outer face of the tank forms an inclined floor for the hopper 3, and the latter is subdivided into two compartments by the walls 8 and 9 the sides of which are secured diametrically opposite each other on the outer face of the tank and the inner face of the hopper.

With this construction it can be readily seen how different kinds of grain may be supplied by the hopper at one time the function of the tank being to keep the trough partly filled with water which enters the trough through the diametrically opposite openings 7 formed in the tank or reservoir 5 at a point approximately intermediate the upper and lower edges of the trough wall 2.

It will be observed that the trough is divided into feeding spaces by the bars 10 the ends of which are secured to the trough wall and outer face of the hopper 3. Thus it will be seen when the hopper 3 is filled with grain the latter will flow through the ports 4 and fill the trough, and at the same time the water contained in the tank will flow through the opening 7 into the trough and rise in the latter until the opening 7 is covered, when the atmospheric pressure exceeding the pressure within the tank will prevent further supply until the water in the trough has again fallen below the opening 7. It will be readily seen that the volume of water within the trough will be about one-half the volume of grain thereby insuring that the latter will be mixed at all times with the proper portion of water thus avoiding having the latter too moist or too dry.

What is claimed is:—

1. In a stock feeder, a feed trough, a feed hopper freely communicating therewith by openings below the upper edge of the feed trough, a water-tank freely communicating with the hopper by openings below the upper edge of the feed trough, and a closure for the top of said tank.

2. In a stock feeder, a feed trough, a feed hopper located interiorly of said feed trough and freely communicating therewith by openings below the upper edge of said trough, a water-tank located interiorly of said hopper and freely communicating therewith by openings below the upper edge of the feed trough, and a closure for the top of said tank.

3. A stock feeder embodying a base plate having a trough wall on the outer edge thereof, a hopper secured to said base plate within said trough wall and provided on its lower portion with openings the upper edges of which are in a plane with the upper edge of said trough wall, a tank on said base plate within said hopper having an opening disposed below the upper edge of said trough and communicating with said hopper.

4. A stock feeder embodying a base plate having a trough wall on the outer edge thereof; a hopper secured to said base plate within said trough wall and provided on its lower portion with a plurality of openings the upper edges of which lie in a plane with the upper edge of said trough wall, a substantially frusto conical tank on said base plate provided at its upper end with a threaded opening for the reception of a screw plug and adjacent its lower end provided with an outlet situated approximately intermediate the upper and lower edges of said trough wall.

In testimony that I claim the foregoing as my own, I have hereto affixed my signature in the presence of two witnesses.

THOMAS C. OTTINGER.

Witnesses:
O. A. JAMES,
W. O. HOPKINS.